United States Patent [19]
Schwitters

[11] Patent Number: 5,515,929
[45] Date of Patent: May 14, 1996

[54] DUAL DISC CULTIVTOR CUTAWAY

[75] Inventor: Wayne J. Schwitters, Clara City, Minn.

[73] Assignee: Amity Technology, Fargo, N. Dak.

[21] Appl. No.: 91,155

[22] Filed: Jul. 12, 1993

[51] Int. Cl.⁶ .......................... A01B 19/10; A01B 73/00; A01B 39/28
[52] U.S. Cl. .................. 172/674; 172/140; 172/166; 172/178; 172/180; 172/254; 172/470; 172/481; 172/488; 172/662
[58] Field of Search .................... 172/662, 481, 172/674, 254, 253, 460, 466, 470, 488, 683, 139, 140, 165, 166, 178, 180

[56] References Cited

U.S. PATENT DOCUMENTS

| | | | |
|---|---|---|---|
| 2,859,677 | 11/1958 | Vincent | 172/460 X |
| 3,511,319 | 5/1970 | Hansen et al. | 172/662 |
| 3,814,191 | 6/1974 | Tilbury | 172/481 X |
| 3,955,627 | 5/1976 | Brown | 172/662 X |
| 4,231,433 | 11/1980 | Whitfield et al. | 172/662 |
| 4,237,985 | 12/1980 | Hoefkes | 172/460 X |
| 4,248,310 | 2/1981 | McWilliams | 172/662 X |
| 4,422,392 | 12/1983 | Dreyer et al. | 172/674 X |
| 4,450,918 | 5/1984 | Danford | 172/662 X |
| 4,485,878 | 12/1984 | Uken | 172/510 |
| 4,991,661 | 2/1991 | Barenthsen | 172/662 |
| 5,054,561 | 10/1991 | Bussiere | 172/674 |
| 5,133,414 | 7/1992 | Youngkrantz | 172/510 |

FOREIGN PATENT DOCUMENTS

| | | | |
|---|---|---|---|
| 2453076 | 5/1975 | Germany | 176/674 |
| 738881 | 10/1955 | United Kingdom | 172/460 |

OTHER PUBLICATIONS

H&S Mfg., Inc., Row Crop Cultivators, leaders In new Ideas For Progressive Farmers, brochure by H & S Manufacturing, Inc., Route 2–Box 215, Stephen, Minnesota 56757 1992.

Elmer's Row Crop Cultivator, Designed with Durability & Versatility for the Farmer of the 90's, brochure by Elmer's Row Crop Equipment, Box 908, Altona, Manitoba Canada R0G 0B0.

Precision Cultivator Alloway Rau, For Close, Precision Tillage . . . Within 2 Inches From The Plant, brochure by Alloway Rau, box 2825, Fargo, North Dakota.

The Day Book '90, The John Day Company Since 1909, Open Top Shield by Tebben Manufacturing, Wet Highway 7, Clara City, Minnesota 56222 1990.

The Sugarbeet Industry Revolves Around WIC, Your Only Complete Sugarbeet Equipment Company in the United States, brochure by WIC Incorporated, Box 460, Clara City, Minnesota 56222.

Primary Examiner—Dave W. Arola
Assistant Examiner—Christopher J. Novosad
Attorney, Agent, or Firm—Peterson, Wicks, Nemer & Kamrath

[57] ABSTRACT

A dual disc cultivator cutaway (10) is disclosed including a frame (30) pivotally mounted to a cultivator tool bar (14) through a bar mount (22). A spindle (38) is pivotally mounted to the opposite end of the frame (30) and slideably mounts first and second arms (40) which in turn rotatably mount the disc blades (44). An adjustment slide (46) is removably pivotally mounted to the upper arm (26) of the cultivator gang assembly and is adjustably, slideably fixed on a bar (45) extending from the spindle (38). Thus, movement of the frame (30) is in a fixed positional relationship with the gang assembly in the cutting and transport positions and pivots with the gang assembly relative to the tool bar (14). When the slide (46) is not attached to the upper arm (26), the frame (30) can be held in an inoperative position relative to the tool bar (14) by a latch (54) pivotally mounted to the tool bar (14) through the bar mount (22) which hooks on a pin (56) attached to the frame (30). In the inoperative position, the frame (30) is supported by the tool bar (14) independent of the gang assemblies.

20 Claims, 2 Drawing Sheets

DUAL DISC CULTIVTOR CUTAWAY

BACKGROUND

The present invention generally relates to row crop cultivators used in farming, particularly to optional accessories for row crop cultivators, specifically to optional accessories for row crop cultivators which cut away the soil adjacent to the row of plants being cultivated, and more specifically to cultivator cutaways utilizing dual disc blades.

Row crops are routinely cultivated one or more times during the growing season. As part of the cultivation operation, it is often desirable to generally vertically cut the soil on opposite sides of the row and additionally to move the soil outwardly such as in a ridging procedure. This is conventionally accomplished utilizing dual disc blades located on opposite sides of the row. It can then be appreciated that it is necessary to raise the disc blades as well as the shovel gangs from the soil during transport and/or turning of the cultivator. Thus, it is conventional for the dual disc blades to be mounted on and movable with the shovel gangs. However, use of the dual disc blades is not desired or necessary for all row crops or cultivation operations. Rather than remove the dual disc blades from the cultivators, it is desirable to move the dual disc blades to an inoperative position so that the dual disc blades do not engage the soil surface independent of the position of the shovel gangs. Due to their conventional mounting to the shovel gangs, all of the weight of the dual disc blade cutaway assembly is then carried by the shovel gangs. Thus weight distribution on the shovel gangs varies when the dual discs are in their operative positions and some of their weight is transferred to the soil surface or in their inoperative positions where all of their weight is carried by the shovel gang. This variation in weight distribution can affect the cultivation function of the particular gang. Additionally, the dual disc blade cutaway assemblies are typically not provided on each of the gangs, with a first gang carrying assemblies for both of the rows between which it is positioned for balancing from side to side and the gangs on the opposite sides being free of cutaway assemblies. Thus, operation between gangs is not consistent due to the variation in weight load between gangs, which is further varied depending upon whether the cutaway assemblies are in their operative or inoperative positions.

Thus, a need exists to allow the use of cutaway assemblies which are movable with and by the gang assemblies but which do not negatively impact the operation of the gang assemblies. In particular, it would be desirable for the gang assemblies to operate in the similar manner whether or not cutaway assemblies are provided and independent of the position of the cutaway assemblies.

SUMMARY

The present invention solves this need and other problems in the field of row crop cultivation by providing, in the preferred form, cultivation means, such as cutaway disc blades, which are movably mounted to the cultivator tool bar between an operative condition and an inoperative condition, with the cultivation means in the operative condition being movable with the gang assembly of the cultivator in a fixed positional relationship between a transport position and a cultivation position, with the cultivation means being spaced from the soil in the fixed positional relationship with the gang assembly in the transport position and providing the soil cultivation operation in the fixed positional relationship with the gang assembly in the cultivation position, and with the cultivator means in the inoperative condition being spaced from the soil independent of the movement of the gang assembly.

It is thus an object of the present invention to provide a novel accessory for row crop cultivators.

It is further an object of the present invention to provide a novel cutaway.

It is further an object of the present invention to provide a novel dual disc blade cutaway.

It is further an object of the present invention to provide such a novel accessory having an operative condition movable in a fixed positional relationship with the gang assemblies of the cultivator.

It is further an object of the present invention to provide such a novel accessory having an inoperative condition independent of the movement of the gang assemblies of the cultivator.

It is further an object of the present invention to provide such a novel accessory which does not negatively impact the operation of the gang assemblies of the cultivator.

It is further an object of the present invention to provide such a novel accessory having an inoperative condition wholly supported and carried by the cultivator tool bar.

It is further an object of the present invention to provide such a novel accessory which can be easily changed between its operative and inoperative conditions.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
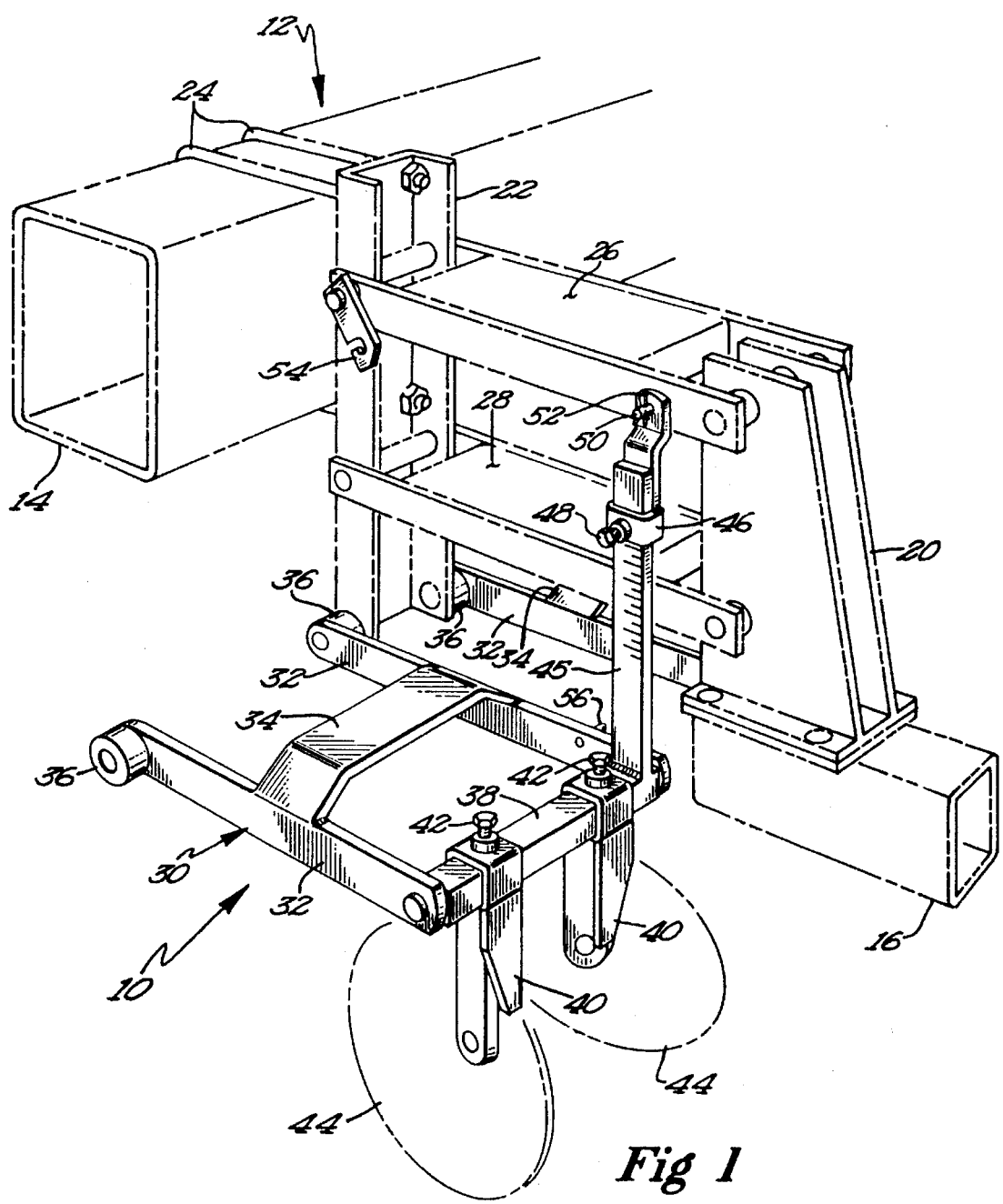
FIG. 1 shows a perspective view of a dual disc cultivator cutaway according to the preferred teachings of the present invention, with portions of a cultivator shown in phantom.
Figure 2:
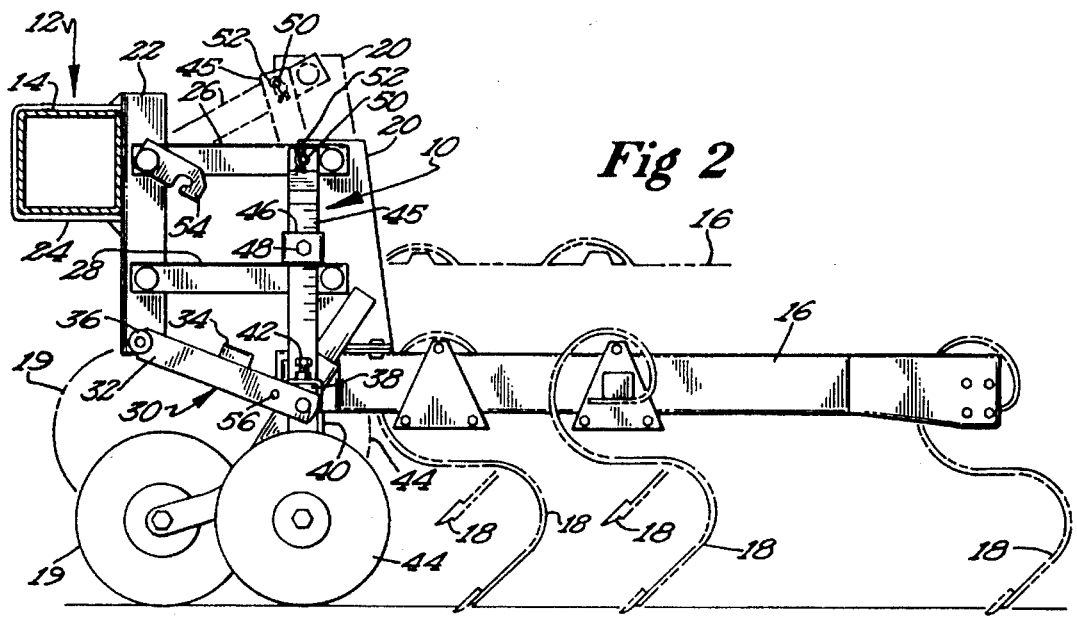
FIG. 2 shows a side view of the dual disc cultivator cutaway of FIG. 1 in its operative condition.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "front", "back", "upper", "lower", "length", "end", "side", "horizontal", "vertical", and similar terms are used herein, it should be understood that these terms have reference only to the structure shown in the drawings as it would appear to a person viewing the drawings and are utilized only to facilitate describing the invention.

DESCRIPTION

A dual disc cultivator cutaway according to the preferred teachings of the present invention is shown in the drawings and generally designated 10. Cutaway 10 is utilized with a multiple row cultivator 12, only portions of which are shown. The number of rows cultivated by cultivator 12 is not particularly critical, as cutaway 10 works on but a single row, with cultivator 12 typically cultivating multiple rows such as four, eight, twelve, and even twenty four rows. Cultivator 12 can be of a variety of constructions. Typically, cultivator 12 includes a primary beam or tool bar 14. Tool bar 14 is typically attached to a tractor by suitable means for movement in the field to be cultivated and may include support wheels for transport. Tool bar 14 is in a generally horizontal condition parallel to the ground and perpendicular to the crop row and the tractor movement direction.

A gang frame 16 carries a gang of shovels 18 for each row. The actual number of shovels 18 depends on the width between the rows being cultivated and the size of shovels 18. For relatively narrow rows (e.g. about 22 inches or 56 centimeters), gangs of three shovels 18 are common, with one being generally centrally located between the rows being cultivated and the other two located to the left and right sides thereof. However, more or less shovels 18 may be used if desired. A gauge wheel 19 may be adjustably secured to gang frame 16 for limiting the depth that shovels 18 extend into the soil and for allowing gang frame 16 and shovels 18 to follow the contour of the soil surface. A vertically extending gang mount 20 is secured to gang frame 16 adjacent to the front end thereof and extending perpendicular thereto.

A bar mount 22 is secured to tool bar 14 by any suitable means such as the U-bolts 24 as shown. An upper arm 26 has a first end pivotally mounted to mount 22 and a second end pivotally mounted to mount 20 about axes which are parallel to each other and tool bar 14 and generally perpendicular to the crop rows and the tractor movement direction. Similarly, a lower arm 28 has a first end pivotally mounted to mount 22 and a second end pivotally mounted to mount 20 about axes which are parallel to each other, the axes of upper arm 26 and tool bar 14 and generally perpendicular to the crop rows and the tractor movement direction. It can then be appreciated that mounts 20 and 22 and arms 26 and 28 form a parallelogram structure, with the length between the pivots of mounts 20 and 22 being generally equal and with the length between the pivots of arms 26 and 28 being generally equal. Gang frame 16 extends generally horizontal and parallel to the soil surface. Additionally, gang frame 16 is movable vertically, with shovels 18 located above the soil surface in a transport position or with shovels 18 extending into the soil in a cultivation position. Specifically, the tractor to which cultivator 12 is attached and/or cultivator 12 includes a suitable lift mechanism, not shown, for moving shovels 18 between their transport and cultivation positions such as by raising and lowering tool bar 14, with suitable stops being provided for arms 26 and/or 28 to prevent downward pivoting therebeyond when tool bar 14 is raised to the transport position. It can be appreciated that a row of plants is located between two gang assemblies, with only one gang assembly shown to allow ease of viewing and illustration of cutaway 10.

Cutaway 10 according to the preferred teachings of the present invention generally includes a frame 30 having first and second arms 32 held in a fixed parallel relation by an integral brace 34 extending therebetween. The front ends of arms 32 include suitable provisions 36, such as the pivot bosses shown, for pivotally mounting arms 32 and frame 30 to adjacent bar mounts 22 about an axis which is parallel to the axes of arms 26 and 28 and tool bar 14 and generally perpendicular to the crop rows and the tractor movement direction. In the most preferred form, bar mount 22 extends vertically below the pivot of lower arm 28, with frame 30 being pivotally mounted to bar mount 22 vertically below lower arm 28. Also, in the most preferred form, frame 30 is pivotally mounted and supported by two bar mounts 22 located on opposite sides of the row being cultivated. It can be appreciated that if only a single gang assembly is provided between rows, each bar mount 22 will pivotally support two frames 30 for the two rows between which the gang assembly is located.

A spindle 38 is located between and pivotally mounted to the back ends of arms 32 of frame 30 by any suitable means about an axis which is parallel to the axes of arms 26 and 28, the axis of frame 30 and bar mount 22, and tool bar 14 and generally perpendicular to the crop rows and the tractor movement direction. First and second arms 40 have upper ends slideably mounted to spindle 38 and which are releasably fixed in position thereon by any suitable means such as set screws 42. Rotatably mounted about generally horizontal axes at the lower ends of each of the first and second arms 40 are disc blades 44.

Cutaway 10 further includes an attachment bar 45 secured generally perpendicular to spindle 38 and extending generally vertically upward therefrom. An adjustment slide 46 is slideably mounted to attachment bar 45 and can be releasably fixed in position thereon by any suitable means such as set screw 48. Attachment bar 45 can include suitable indicia thereon to show the relative positioning of slide 46 on bar 45. Adjustment slide 46 is removably pivotally mounted to the gang assembly and in the preferred form to upper arm 26 thereof. In the most preferred form, a pin 50 extends generally horizontally from upper arm 26 which is slideably and rotatably received in an aperture formed in adjustment slide 46. Adjustment slide 46 can be prevented from sliding from pin 50 such as by a hair pin 52. Thus, adjustment bar and slide 45 and 46 form a rigid attachment link between spindle 38 and frame 30 and arm 26 and the gang assembly to maintain frame 30 and disc blades 44 mounted thereto in an adjustable, fixed positional relationship with arm 26 and the gang assembly.

Cutaway 10 further includes a latch 54 having a first end pivotally mounted to bar mount 22, which in the preferred form is along the same axis of the pivot of upper arm 26 to bar mount 22. Latch 54 further has a second end for hooking upon a pin 56 extending from one of the arms 32 of frame 30 adjacent to but in front of spindle 38.

Now that the basic construction of cutaway 10 according to the preferred teachings of the present invention has been set forth, the operation and subtle features of cutaway 10 can be explained and appreciated. Specifically, a second parallelogram structure is formed by bar mount 22, upper arm 26, frame 30, and the attachment link formed by adjustment bar and slide 45 and 46, with the length between the pivots of bar mount 22 and of adjustment bar and slide 45 and 46 being generally equal and the length between the pivots of upper arm 26 and of frame 30 being equal. Thus, when adjustment slide 46 is pivotally secured to upper arm 26 (and latch 54 is not hooked on pin 56), frame 30 moves in the fixed positional relationship with the gang assembly when moving shovels 18 between their transport and cultivation positions. Particularly, disc blades 44 are movable with shovels 18 from a transport position located above the soil surface when shovels 18 are located in their transport position (with the proper adjustment of the length between the pivots of adjustment bar and slide 45 and 46) and a cultivation or cutting position when shovels 18 are located in their cultivation positions. The depth to which disc blades 44 extend into the soil relative to the depth which shovels 18 extend into the soil can be adjusted by adjustment of the fixed positional relationship between frame 30 and the gang assembly and specifically by varying the position of adjustment slide 46 on bar 45 and thus the fixed length between the pivots of adjustment bar 45 and slide 46. In this regard, due to the fixed positional relationship between frame 30 and the gang assembly provided by the rigidity of the attachment link formed by bar and slide 45 and 46 pivotally mounted therebetween, the gravitational weight of the gang assembly will push and hold disc blades 44 into the soil in the cultivation position. Additionally, while in the cutting position, cutaways 10 float with the gang assembly and particularly move up and down with relation to gauge wheel 19 according to the contour of the soil surface adjacent to the gang assembly.

Figure 3:
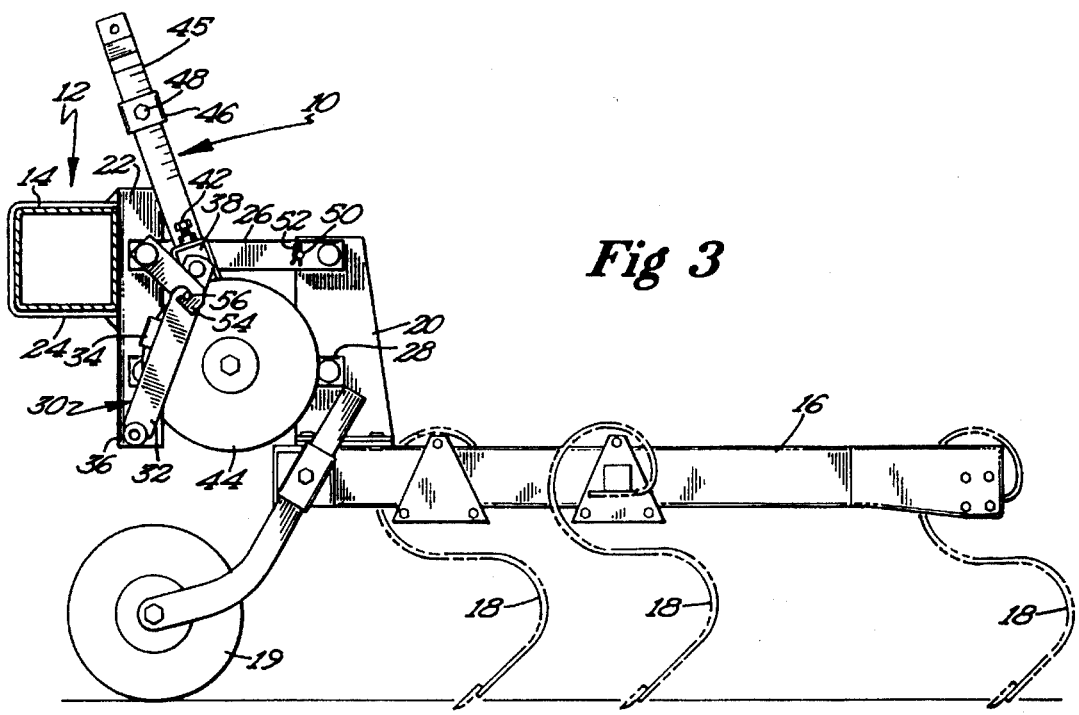
FIG. 3 shows a side view of the dual disc cultivator cutaway of FIG. 1 in its inoperative condition.

According to the teachings of the present invention, cutaway 10 is also positionable in an inoperative position which does not engage the soil independent of the position of shovels 18. Specifically, in the preferred form, attachment of adjustment bar and slide 45 and 46 to upper arm 26 can be removed by removing hair pin 52 from pin 50 and sliding adjustment slide 46 from pin 50. After removal, hair pin 52 can be reinserted into pin 50 to prevent loss. Cutaway 10 can then be manually pivoted about the pivot between frame 30 and bar mount 22 until latch 54 can be hooked on pin 56 as shown in FIG. 3. With latch 54 hooked on pin 56, frame 30 is held in the inoperative position with disc blades 44 positioned above the soil surface independent of the movement of the gang assembly. In the most preferred form and in the inoperative position, movement of shovels 18 can occur relative to tool bar 14 without movement of frame 30 and disk blades 44 relative to tool bar 14 with latch 54 hooked on pin 56 removably securing frame 30 to tool bar 14 to hold frame 30 and disc blades 44 in the inoperative condition. Additionally, as all weight of cutaway 10 is carried by bar mount 22 and ultimately tool bar 14 when frame 30 is removably secured to tool bar 14, no weight is transferred to gang frame 16, shovels 18, gang mount 20, or arms 26 and 28. Thus, the gang assembly functions as it would if cutaways 10 were removed from cultivator 12 when cutaways 10 are located in their inoperative positions. Additionally, due to the pivotal mounting of frame 30 to tool bar 14 through mount 22, considerable clearance can be provided for passage of the crop rows when cutaway 10 is located in the inoperative position, as shown in FIG. 3 according to the preferred teachings of the present invention.

It can be appreciated that cutaway 10 can be rapidly and easily changed between its operative and inoperative conditions. Specifically, to place cutaway 10 in its operative condition, latch 54 is simply released from pin 56 and adjustment slide 46 is slid on pin 50 and removably secured in position by hair pin 52. To place cutaway 10 in its inoperative condition, slide 46 is removed from pin 50 in a manner as previously set forth and frame 30 is pivoted to the inoperative position and removably secured to tool bar 14 by hooking latch 54 on pin 56 to hold frame 30 and disc blades 44 in the inoperative condition.

Now that the basic teachings of the present invention have been explained, many extensions and variations will be obvious to one having ordinary skill in the art. For example, although the cultivation operation of vertically cutting away and moving the soil adjacent to a crop row is accomplished in the most preferred form by rotary disc blades 44, such cultivation operation could be accomplished in other manners. Similarly, other apparatus for providing other and/or similar soil cultivation operations could be provided than as performed by rotary disc blades 44.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

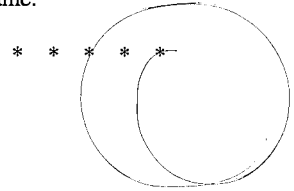

What is claimed is:

1. An accessory for use with a soil cultivator having a tool bar and at least one gang assembly, with the gang assembly being movably mounted to the tool bar and movable between a transport position and a cultivation position, with the gang assembly being spaced from the soil in the transport position and cultivating the soil in the cultivation position, comprising, in combination: means for providing a soil cultivation operation; and means for movably mounting the cultivation means to the tool bar between an operative condition and an inoperative condition, with the cultivation means in the operative condition being movable with the gang assembly in a fixed positional relationship between a transport position and a cultivation position, with the cultivation means being spaced from the soil in the fixed positional relationship with the gang assembly in the transport position and providing the soil cultivation operation in the fixed positional relationship with the gang assembly in the cultivation position, and with the degree of spacing of the cultivation means from the soil in the inoperative condition being independent of the movement of the gang assembly.

2. The accessory of claim 1 wherein the cultivation means comprises means for vertically cutting the soil.

3. The accessory of claim 2 wherein the vertically cutting means comprises at least a first disc blade rotatable about a generally horizontal axis as the tool bar is moved along the soils.

4. The accessory of claim 3 wherein the movably mounting means comprises, in combination: a frame separate from the gang assembly; and means for pivotally mounting the frame to the tool bar independent of the movement of the gang assembly.

5. The accessory of claim 4 wherein the movably mounting means further comprises, in combination: means for removably securing the frame directed to the tool bar to hold the frame and the cultivation means in the inoperative condition, with movement of the gang assembly relative to the tool bar occurring without movement of the frame and the cultivation means relative to the tool bar in the inoperative condition.

6. The accessory of claim 5 wherein the movably mounting means further comprises, in combination: means for removably securing the frame to the gang assembly to hold the frame and the cultivation means in the fixed positional relationship in the operative condition.

7. The accessory of claim 6 wherein the gang assembly includes an arm pivotally mounted to the tool bar; and wherein the means for removably securing the frame to the gang assembly comprises, in combination: a rigid attachment link having a first end pivotally mounted to the frame and a second end removably, pivotally mounted to the arm.

8. The accessory of claim 7 wherein the rigid attachment link comprises, in combination: a bar pivotally mounted to the frame; and an adjustment slide adjustably, slideably positionable on the bar, with the adjustment slide removably, pivotally mounted to the arm.

9. The accessory of claim 8 wherein the movably mounting means further comprises, in combination: a spindle pivotally mounted to the frame about an axis parallel to an axis of the means for pivotally mounting the frame to the tool bar; and means for mounting the cultivation means to the spindle, with the bar mounted to the spindle.

10. The accessory of claim 9 wherein the means for mounting the cultivation means to the spindle comprises means for slideably mounting the cultivation means to the spindle.

11. The accessory of claim 7 wherein the movably mounting means further comprises, in combination: a spindle pivotally mounted to the frame about an axis parallel to an axis of the means for pivotally mounting the frame to the tool bar; and means for mounting the cultivation means to the spindle, with the first end of the rigid attachment link mounted to the spindle.

12. The accessory of claim 4 wherein the movably mounting means further comprises, in combination: means for removably securing the frame to the gang assembly to hold the frame and the cultivation means in the fixed positional relationship in the operative condition.

13. The accessory of claim 1 wherein the movably mounting means comprises, in combination: a frame separate from the gang assembly; and means for pivotally mounting the frame to the tool bar independent of the movement of the gang assembly.

14. The accessory of claim 13 wherein the movably mounting means further comprises, in combination: means for removably securing the frame to the gang assembly to hold the frame and the cultivation means in the fixed positional relationship in the operative condition.

15. The accessory of claim 14 wherein the gang assembly includes an arm pivotally mounted to the tool bar; and wherein the means for removably securing the frame to the gang assembly comprises, in combination: a rigid attachment link having a first end pivotally mounted to the frame and a second end removably, pivotally mounted to the arm.

16. The accessory of claim 15 wherein the rigid attachment link comprises, in combination: a bar pivotally mounted to the frame; and an adjustment slide adjustably, slideably positionable on the bar, with the adjustment slide removably, pivotally mounted to the arm.

17. The accessory of claim 16 wherein the movably mounting means further comprises, in combination: a spindle pivotally mounted to the frame about an axis parallel to an axis of the means for pivotally mounting the frame to the tool bar; and means for mounting the cultivation means to the spindle, with the bar mounted to the spindle.

18. The accessory of claim 17 wherein the means for mounting the cultivation means to the spindle comprises means for slideably mounting the cultivation means to the spindle.

19. The accessory of claim 13 wherein the movably mounting means further comprises, in combination: means for removably securing the frame directly to the tool bar to hold the frame and the cultivation means in the inoperative condition, with movement of the gang assembly relative to the tool bar occurring without movement of the frame and the cultivation means relative to the tool bar in the inoperative condition.

20. The accessory of claim 19 wherein the means for removably securing the frame directly to the tool bar comprises, in combination: a latch pivotally mounted to the tool bar; and a pin attached to the frame, with the latch hooking on the pin of the frame.

* * * * *